US012719751B2

(12) United States Patent
Cam-Winget et al.

(10) Patent No.: US 12,719,751 B2
(45) Date of Patent: Aug. 25, 2026

(54) METHOD AND SYSTEM FOR DEVICE IDENTITY MANAGEMENT

(71) Applicant: Cisco Technology, Inc., San Jose, CA (US)

(72) Inventors: Nancy Cam-Winget, Mountain View, CA (US); Jeffery Rodd Daviss, Port Coquitlam (CA); Shiladitya Dey, Kolkata (IN); Brian Somers, North Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 115 days.

(21) Appl. No.: 18/739,965

(22) Filed: Jun. 11, 2024

(65) Prior Publication Data

US 2025/0175389 A1 May 29, 2025

Related U.S. Application Data

(60) Provisional application No. 63/603,237, filed on Nov. 28, 2023.

(51) Int. Cl.

| | |
|---|---|
| ***H04L 9/40*** | (2022.01) |
| ***G16Y 40/35*** | (2020.01) |
| ***H04L 41/0893*** | (2022.01) |
| *G16Y 10/40* | (2020.01) |

(52) U.S. Cl.

CPC .......... *H04L 41/0893* (2013.01); *G16Y 40/35* (2020.01); *H04L 63/08* (2013.01); *G16Y 10/40* (2020.01)

(58) Field of Classification Search

CPC ...... G16Y 10/40; H04L 41/0893; H04L 63/08

See application file for complete search history.

(56) References Cited

U.S. PATENT DOCUMENTS

| | | | | |
|---|---|---|---|---|
| 2002/0148090 | A1* | 10/2002 | Kaburagi | G06Q 10/04 29/403.1 |
| 2003/0105732 | A1 | 6/2003 | Kagalwala et al. | |
| 2008/0148339 | A1 | 6/2008 | Hill et al. | |
| 2010/0211511 | A1* | 8/2010 | Kawasaki | G06Q 50/04 705/348 |
| 2014/0242969 | A1* | 8/2014 | Shimizu | G06F 9/44526 455/419 |
| 2016/0103771 | A1 | 4/2016 | Bhesania et al. | |
| 2018/0276313 | A1* | 9/2018 | Comenzo | G06F 3/0481 |

(Continued)

OTHER PUBLICATIONS

International Search Report and Written Opinion for International Application No. PCT/US2024/056599, mailed Mar. 4, 2025, 14 Pages.

*Primary Examiner* — Gil H. Lee

(74) *Attorney, Agent, or Firm* — Baker Botts L.L.P.

(57) ABSTRACT

In an embodiment, a method includes onboarding a vendor to an object model, generating a component class in the object model, generating a device class in the object model, and generating a device in the object model. The vendor is associated with a vendor identity, the component class is associated with a component class identity, the device class is associated with a device class identity, and the device is associated with a device identity. The method further includes generating an identity record for a component of the device using the vendor identity, the component class identity, the device class identity, and the device identity.

20 Claims, 4 Drawing Sheets

(56) References Cited

U.S. PATENT DOCUMENTS

| | | | | |
|---|---|---|---|---|
| 2019/0295106 | A1* | 9/2019 | Davar | G06Q 30/0201 |
| 2020/0314107 | A1 | 10/2020 | Joshi et al. | |
| 2020/0342430 | A1* | 10/2020 | Li | G06F 16/245 |
| 2020/0358827 | A1 | 11/2020 | Foxhoven et al. | |
| 2021/0019358 | A1* | 1/2021 | Duckworth | G06F 16/5854 |
| 2021/0099339 | A1 | 4/2021 | Behm et al. | |
| 2021/0266185 | A1 | 8/2021 | Konda et al. | |
| 2023/0083295 | A1 | 3/2023 | Grant | |
| 2023/0146707 | A1* | 5/2023 | Malaspina | G06Q 10/0875 705/26.63 |
| 2023/0262132 | A1 | 8/2023 | Quinn et al. | |

* cited by examiner

METHOD AND SYSTEM FOR DEVICE IDENTITY MANAGEMENT

BENEFIT CLAIM

This application claims the benefit under 35 U.S.C. § 119(e) of provisional patent application 63/603,237, filed Nov. 28, 2023, the entire contents of which are hereby incorporated by reference as if fully set forth herein.

TECHNICAL FIELD

The present disclosure relates generally to Internet of Things (IoTs), and more particularly, to a method and a system for device identity management.

BACKGROUND

Conventional approaches utilizing schemas to define a component structure exist today. In existing systems, identities of devices may have a one-to-one (1:1) mapping from a device to an identity. For example, enterprise deployments may define an identity that may be a one-to-one mapping between a device and its assigned identifier. As another example, enterprise deployments may define an identity that may be a one-to-one mapping between a vendor and its assigned identifier. These assigned identifiers may be coarse and may not provide further information or data about the device and/or vender. When traffic originates from such devices, aiding observability platforms and granular policies may not be instantiated and may be a difficult task to update policy enforcements for the devices.

DETAILED DESCRIPTION

Overview

Figure 1:
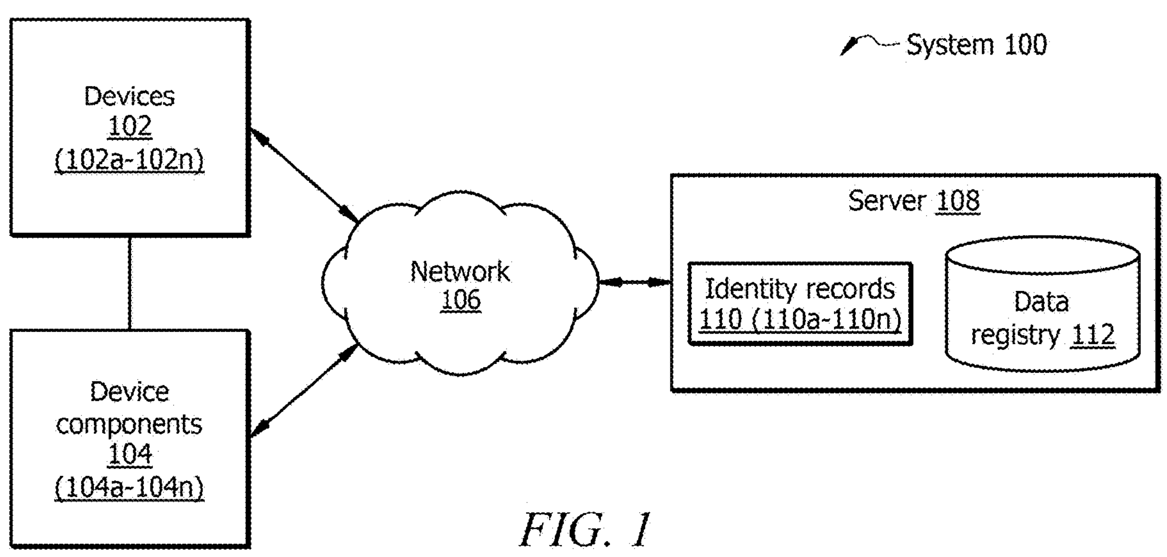
FIG. 1 illustrates system for device identity management, according to an embodiment.

Embodiments of the present disclosure relate to device identity management. In an embodiment, a server includes one or more processors and one or more computer-readable non-transitory storage media coupled to the one or more processors and comprising instructions that, when executed by the one or more processors, cause the server to perform operations. The operations include onboarding a vendor to an object model, generating a component class in the object model, generating a device class in the object model, and generating a device in the object model. The vendor is associated with a vendor identity, the component class is associated with a component class identity, the device class is associated with a device class identity, and the device is associated with a device identity. The operations further include generating an identity record for a component of the device using the vendor identity, the component class identity, the device class identity, and the device identity.

In certain embodiments, the vendor identity and the identity record are each a globally unique identifier, and the component class identity, the device class identity, and the device identity are each a unique identifier with respect to the vendor but not a globally unique identifier.

In some embodiments, the operations include assigning the identity record to a group, wherein the group comprises a plurality of identity records, the plurality of identity records is associated with a plurality of devices and a plurality of vendors, and each of the plurality of identity records shares the same component class identity. The operations may include assigning a policy to the group.

In certain embodiments, the vendor is associated with a managing organization. The vendor is granted read-write permissions to the component class, the device class, and the device but a read-only permission to the group. The managing organization is granted read-write permissions to the group but a read-only permission to the component class, the device class, and the device.

In some embodiments, the operations include provisioning, during manufacturing, the device with the identity record. In certain embodiments, the operations include communicating the identity record to a cloud-based registration service, wherein the cloud-based registration service performs registration via an out-of-band system.

In certain embodiments, the operations include mapping the identity record to a group identity, receiving, from the device, the identity record, validating authentication credentials associated with the device, and communicating the mapping of the identity record to the group identity to the device in response to validating the authentication credentials. In some embodiments, the operations include applying a policy to the component of the device. The policy is enforced based on the group identity, and the identity record is used to identify the component of the device.

In some embodiments, the device represents an automobile, the vendor represents a maker of the automobile, the device class represents a model produced by the maker of the automobile, the component class represents a component of the model produced by the maker of the automobile, and the device identity represents a serial number assigned to the automobile.

In another embodiment, a method includes onboarding a vendor to an object model, generating a component class in the object model, generating a device class in the object model, and generating a device in the object model. The vendor is associated with a vendor identity, the component class is associated with a component class identity, the device class is associated with a device class identity, and the device is associated with a device identity. The method further includes generating an identity record for a component of the device using the vendor identity, the component class identity, the device class identity, and the device identity.

In yet another embodiment one or more computer-readable non-transitory storage media embody instructions that, when executed by a processor, cause the processor to perform operations. The operations include onboarding a vendor to an object model, generating a component class in the object model, generating a device class in the object model, and generating a device in the object model. The vendor is associated with a vendor identity, the component class is associated with a component class identity, the device class is associated with a device class identity, and the device is associated with a device identity. The operations further include generating an identity record for a component of the device using the vendor identity, the component class identity, the device class identity, and the device identity.

Current cloud security offerings rely on human interaction to onboard devices. Multiple user dimensions (MUD) may be one mechanism to help define the device's communication intent from a vendor's perspective. There is still the need to distinctly identify the device itself; more importantly, from an enforcement control point, that device needs to be uniquely identified from all other devices coming through for protection.

In an embodiment, the present disclosure discloses the use of an IoT identity model that involves an ability to allow for both refined filtering for reporting as well as refined policy groupings based on subcomponents within a device class instance of the IoT identity model. Management and separately provisioning the identity of the IoT device and IoT components to the security service involves a difficult task as the components are tightly coupled with the IoT device.

Technical advantages of this disclosure include one or more of the following. Certain embodiments determine identity records perform lookup API in a data registry to update security policy enforcement for a group of device components. Certain embodiments of this disclosure provide data privacy where the security reports may be private to the vendor (e.g., an automobile manufacturer or rental company that acts as a fleet manager who is not able to access them). Certain embodiments of this disclosure provide isolation of use case. For example, the automobile manufacturer company may not need to manage the automobile rental company's vehicles to update security policy enforcements for different computing device components of the vehicle. Another advantage may include providing a security service, which may work in the future to provide additional types of DNS policy, like content filtering, to fleets for specific businesses.

The aggregation of identity records into groups provides the following benefits. Aggregation of policy-enabled identities greatly simplifies the policy data that would have been necessary, had each IoT component been given its own policy-enabled identity. In turn, this aggregation greatly reduces the amount of policy data that must be stored and forwarded within the IoT cloud services. Management of the policies and the identities to which the policies apply is simplified due to the vast reduction in the number of identities that need to be managed. Inclusion of the identity record in policy event details still provides unique identification of the policy event source.

The aggregation of identity records into groups, where the group identity of a group is a policy-enabled identity, provides the following advantages. When compared to using identity records directly as policy-enabled identities, there are a reduced number of policy identities to manage. Several identity records may be associated with a given group identity, which allows scalability beyond what would be possible if the identity records were policy-enabled identities because the volume of identities is greatly reduced. Because the association of the identity records to groups can change, and because the groups may be owned by different organizations, this object model allows delegation of policy management to organizations other than the vendor's organization. The vendor may impose requirements on the policies in the organization to which policy management was delegated. Adding the ability to have the vendor organization enforce certain policy rules/constraints may be required, in addition to allowing the delegated organization to augment a policy from the manufacturer's organization.

Separation of registration from the IoT device into a backend or out-of-band system means that any cloud outage does not impact the IoT device assembly line, and additional security may be added to the registration service, which reduces the attack surface of the IoT cloud services offering. The lookup service, which provides the mapping of identity record to group identity, may be the only endpoint used directly by the on-device agent and is therefore may be the only service that is highly scalable and highly available. The lookup service may provide a read-only view of the mapping, so the risk of data corruption or compromise is greatly reduced.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

FIG. 1 illustrates a system 100 for device identity management, in accordance with certain embodiments. System 100 or portions thereof may be associated with an entity, which may include any entity, such as a business or company, that performs device identity management. The components of system 100 may include any suitable combination of hardware, firmware, and software. For example, the components of system 100 may use one or more elements of the computer system of FIG. 5. In the illustrated embodiment of FIG. 1, system 100 includes devices 102 (**102*a*-102*n*), device components 104 (104*a*-104*n*), a network 106, a server 108, identity records 110 (110*a*-110*n*), and a data registry 112. The letter n denotes any suitable integer. For example, devices 102*a*-102*n*** represents any suitable number of devices.

Devices 102 of system 100 represent physical objects made or adapted for a particular purpose. In certain embodiments, devices 102 have IoT capabilities. In some embodiments, devices 102 may include automobiles, vehicles, cars, medical devices, lighting devices or any other suitable type of device. One or more devices 102 may be a composite device that includes multiple device components 104 that may be networked within device 102.

Device components 104 of system 100 represent parts of devices 102 that are made or adapted for a particular purpose. In certain embodiments, device components 104 are subsystems that provide computing resources. Device components 104 may include IoT components. For example, if device **102*a* is an automobile, device components 104** may include infotainment systems, a map system, a global positioning system (GPS), electronic control units (ECU) associated with wheels of the automobile, advanced driver assistance systems (ADAS), fuel level measurement units, pressure units of tires, etc.

Figure 2:
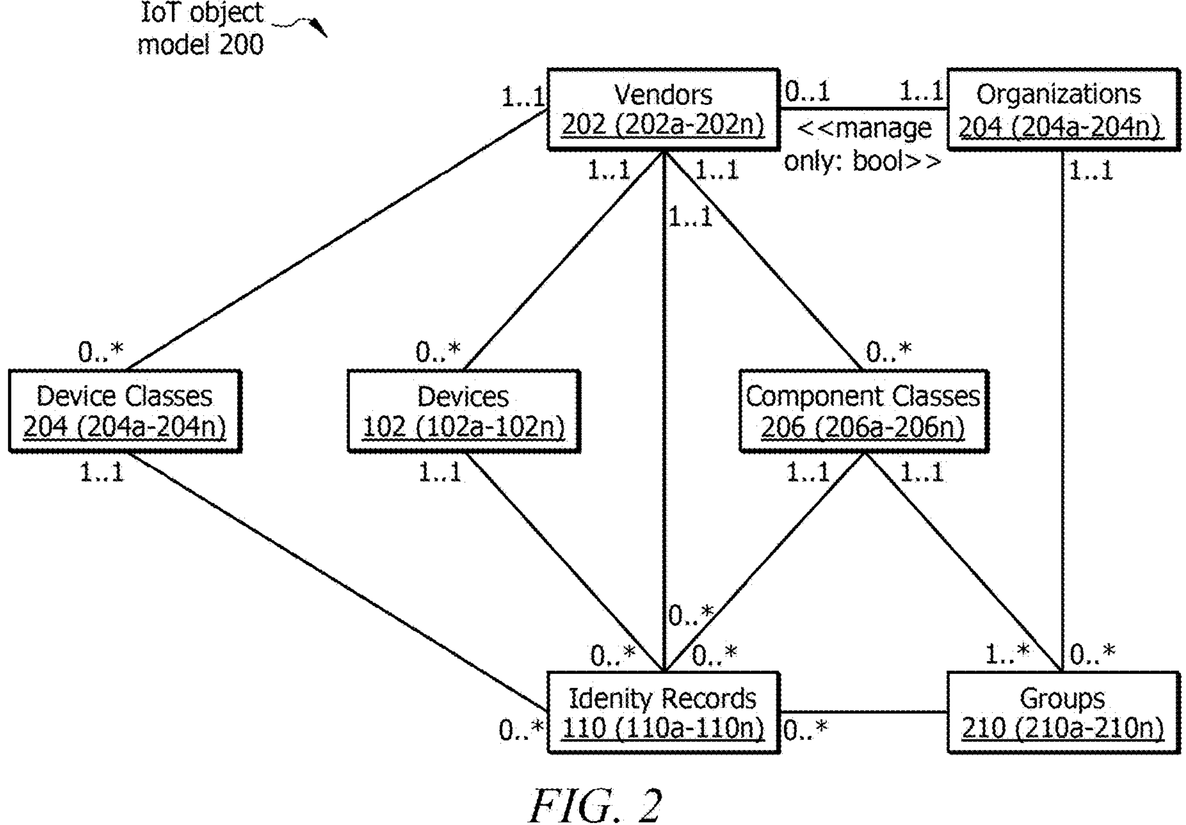
FIG. 2 illustrates a diagram of an Internet of Things (IoT) object model, according to an embodiment.

In certain embodiments, devices 102 may be associated with one or more vendors (e.g., vendors 202 of FIG. 2). The vendor represents an entity that may distribute, manufacture, and/or manage devices 102 and/or device components 104. In certain embodiments, the vendor manages one or more security policies for devices 102 and/or device components 104. Each vendor may be assigned a vendor identity. In some embodiments, one or more vendors may define a device identity for one or more devices 102.

Network 106 of system 100 represents a set of computers that share resources located on or provided by network nodes. Network 106 allows for data exchange, exchange of DNS requests, authentication tokens, security policy enforcement, and communications between elements of network 106. Examples of network 106 include, without limitation, an ad hoc network, an intranet, an extranet, a virtual private network (VPN), a local area network (LAN), a wireless local area network (WLAN), a wide area network (WAN), a wireless wide area network (WWAN), a metropolitan area network (MAN), a portion of the Internet, a portion of the Public Switched Telephone Network (PSTN), near-field communication (NFC) network, a cellular technology-based network, a satellite communications technology-based network, Bluetooth, a cellular telephone network, or a combination of two or more of these networks.

In certain embodiments, network 106 may include any suitable links. The links may include but are not limited to, one or more wireline (for example, Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET), satellite links or Synchronous Digital Hierarchy (SDH)) links. Links need not necessarily be the same throughout network 106. One or more links may differ in one or more aspects from one or more other links. In some embodiments, the data exchange and communication over network 106 may be formatted in a variety of different ways including, for example, using hypertext markup language (HTML), cascading style sheet (CSS), JavaScript, extensible markup language (XML), or JavaScript object notation (JSON). In an embodiment, devices 102, device components 104, and other elements of network 106 may host or include interfaces that are compatible with one or more other networks 106 and are programmed or configured to use standardized protocols for communication across the networks such as application programming interface (API) calls, transmission control protocol (TCP)/internet protocol (IP), Bluetooth, and higher-layer protocols such as hypertext transfer protocol (HTTP), transport layer security (TLS), and the like.

Server 108 of system 100 represents a computer or system that provides resources, data, services, and/or programs to other elements over network 106. In certain embodiments, one or more vendors may be associated with server 108. In an embodiment, server 108 may execute in a multi-tenant, multi-instance architecture in which large numbers of requests (e.g., DNS requests) of any of or any number of device components 104 and devices 102 are processed, using separate or shared data storage with security controls.

Server 108 may include a set of executable program instructions or units of instructions such as executables, binaries, packages, functions, methods, or objects that are hosted using public data centers, private data centers, or cloud computing facilities. Server 108 may be programmed to execute a per-tenant basis update security policy enforcements. In an embodiment, server 108 may be any computing device that is hard-wired to perform the techniques. Server 108 may include digital electronic devices such as at least one application-specific integrated circuit (ASIC) or field programmable gate array (FPGA) that is persistently programmed to perform the techniques. Server 108 may include at least one general purpose hardware processor programmed to perform the techniques pursuant to program instructions in firmware, memory, other storage, or a combination thereof.

In particular embodiments, server 108 may be associated with one or more servers. Each server may be a unitary server or a distributed server spanning multiple computers or multiple data centers. Servers may be of various types, such as, for example, and without limitation, web servers, API servers, news servers, mail servers, message servers, advertising servers, file servers, application servers, exchange servers, database servers, proxy servers, and other servers suitable for performing functions or processes described herein, or any combination thereof. In particular embodiments, each server may include hardware, software, or embedded logic components or a combination of two or more such components for carrying out the appropriate functionalities needed to perform lookup API for updating security policy enforcement. In an embodiment, server 108 may be a web server including an HTTP server that can process requests (e.g., user-specific requests, DNS requests, and API requests) and transmit responses (e.g., responses including HTML payloads with dynamically generated web pages). Server 108 may include a firewall, load balancer, or other infrastructure. In some embodiments, server 108 may be programmed as multiuser software-as-a-service (SaaS) applications that interoperate with devices 102 and device components 104 via browsers.

Identity records 110 of system 100 are records used to identify a specific device component (e.g., device component 104*a*) within a particular device (e.g., device 102*a*). In certain embodiments, each identity record 110 is a composite, globally unique record that represents the following information: a vendor identity, a device class identity, a component class identity, and a device identity. In some embodiments, each identity record 110 includes a vendor identity, a device class identity, a component class identity, and a device identity. For example, each identity record 110 may be generated by concatenating includes a vendor identity, a device class identity, a component class identity, and a device identity. The vendor identity, device class identity, component class identity, and device identity are further described in FIG. 2 below.

Data registry 112 of system 100 represents an organized collection of data. In certain embodiments, data registry 112 captures and analyzes the data. Data registry 112 may be used to store identity records 110, policies, or any other suitable type of information. Devices 102, device components 104, network 106, server 108, identity records 110, and data registry 112 may be used by one or more elements described in FIGS. 2 through 4 below.

FIG. 2 illustrates a diagram of an IoT object model 200, according to an embodiment. IoT object model 200 represents an object-based logical model that uses the concepts of objects and relationships. IoT object model 200 may use properties of objects in a specific computer programming language (e.g., Java). IoT object model 200 may use different data types (e.g., string, number, Boolean, array, object, etc.). In certain embodiments, IoT object model 200 includes object references, interfaces, actions, exceptions, and the like. In the illustrated embodiment of FIG. 2, IoT object model 200 includes vendors 202 (vendors 202*a*-202*n*), organizations 204 (organizations 204*a*-204*n*), device classes 206 (206*a*-206*n*), devices 102 (102*a*-102*n*), component classes 208 (208*a*-208*n*), identity records 110 (110*a*-110*n*), and groups 210 (210*a*-210*n*).

Vendors 202 of IoT object model 200 represent entities associated with devices 102. For example, vendors 202 may distribute, manufacture, and/or manage devices 102. Each vendor 202 may be represented by a vendor identity. Identities in general are recorded sets of measurable characteristics by which a computer can identify external entities (e.g., vendors, devices, etc.). Identities may consist of letters, numerals, symbols, and the like. The vendor identity may be any suitable size (e.g., 4 bytes). Vendors 202 may represent automobile manufacturers, lightbulb manufacturers, medical equipment providers, and the like.

Organizations 204 of IoT object model 200 represent logical entities that manage and/or apply policies. In some embodiments, organizations 204 represent subscribers to one or more services (e.g., IoT services). Each organization 204 may be associated with an organization identity. In certain embodiments, an organization identity is an identifier that represents organization 204 in a cloud service provider's data environment. Each organization 204 may be associated with its own groups 210, policies, event data, etc. Organizations 204 may represent vendors (a vending organization), manage organizations (a managing organization), etc. A vending organization has read-write privileges to device classes 206, component classes 208, identity records 110, devices 102, and groups 210 associated with a particular vendor (e.g., vendor 202*a*), whereas a managing organization has read-only privileges to existing device classes 206, component classes 208, identity records 110, and devices 102 from a given vendor (e.g., vendor 202*a*) but read-write privileges to groups 210 for the vendor. For example, the managing organization may not add or modify identity records 110, but may create its own groups 210 based on component classes 208.

Devices 102 of IoT object model 200 represent physical objects made or adapted for a particular purpose. In certain embodiments, devices 102 have IoT capabilities. Each device 102 may represent a specific physical IoT device. In certain embodiments, each device 102 is assigned a device identity. The device identity may be assigned by vendor 202. The device identity may be of variable length (e.g., ranging from 1 to 45 bytes). The device identity may be a serial number (e.g., a vehicle inspection number (VIN)). In some embodiments, devices 102 represent automobiles, medical devices, lighting devices, and other types of devices.

Device classes 206 represent the different types of devices provided by a particular vendor 202. As an example, each automobile model (e.g., Avalon, Camry, Corolla, and Prius) made by a particular automobile manufacturer (e.g., Toyota) may represent a different device class (e.g., device class 206*a* device class 206*b*, and device class 206*c*, respectively). Each device class 206 may be represented by a device class identity. The device class identity may be assigned by vendor 202. The device class identity may be any suitable length (e.g., a 4-byte value).

Component classes 208 represent components of devices 102 that provide a specific functionality. For example, component classes 208 for automobiles may include engines, sensors, cameras, GPS trackers, infotainment, etc. Component classes 208 are each assigned a component class identity. The component class identity may be assigned by the vendor (e.g., vendor 202*a*). The component class identity may be any suitable length (e.g., an 8-byte value). In certain embodiments, the component class identity represents a description of the device component. In some embodiments, each component class 208 represents a type of each of the device components that requires its own DNS security policy enforcement. For example, component class 208*a* may represent device component 104*a* (e.g., an engine) for a plurality of devices 102 (e.g., devices 102*a*-102*n*).

Identity records 110 of IoT object model 200 represent globally unique records based on a combination of two or more of the following: a vendor identity, a device class identity, a component class identity, and/or a device identity. For example, one or more identity records 110 may be generated by concatenating the vendor identity, the device class identity, the component class identity, and/or the device identity. In certain embodiments, a particular component within a specific device (e.g., device 102*a*) may be uniquely identified using an identity record (e.g., identity record 110*a*). In certain embodiments, each device 102 is represented by a set of identity records 110.

Identity records 110 of a particular device may share a vendor identity, a device class identity, and a device identity, but differ by the component class identities. For example, device 102*a* may be associated with: (1) identity record 110*a* identifying vendor 202*a*, device class 206*a*, device 102*a*, and component class 208*a*; (2) identity record 110*b* identifying vendor 202*a*, device class 206*a*, device 102*a*, and component class 208*b*; and (3) identity record 110*c* identifying vendor 202*a*, device class 206*a*, device 102*a*, and component class 208*c*.

Groups 210 of IoT object model 200 represent sets of identity records 110. Each group (e.g., group 210*a*) may be associated with a plurality of identity records 110 having the same component class identity. Groups 210 may have an optional restriction based on a component class 208 (e.g., component class 208*a*) of an identity record (e.g., identity record 110*a*). For example, group 210*a* may only include identity records 110 with component class 208 set as a particular value. In certain embodiments, a newly defined identity record 110 is initially associated with a default group. Each group 210 within organization 204 may be associated with a group identity. In certain embodiments, the group identity is policy aware.

In certain embodiments, IoT object model 200 may be associated with one or more IoT cloud services (e.g., a management service, a registration service, or a lookup service). A management service represents a cloud-available service that allows definition of component classes 208 and/or device classes 206 within the context of a vendor (e.g., vendor 202*a*). In certain embodiments, the management service allows changing the association of identity records 110 with group identities.

A registration service (e.g., registration service 406 of FIG. 4) represents a cloud-available service that associates newly created identity records 110 with their default group identities. A lookup service (e.g., lookup service 402 of FIG. 4) represents a cloud-available service that allows a lookup of group identities given a set of identity records 110. An IoT cloud service provider represents an entity that offers IoT policy services to other organizations 204 and vendors 202. A policy is a set of rules that describes restrictions or allowances based on some form of identity.

In some embodiments, prior to manufacturing devices 102 requiring security services, a vendor (e.g., vendor 202*a*) is onboarded to IoT object model 200. The onboarding process may define the organization (e.g., organization 2024*a*) and vendor (e.g., vendor 202*a*). Prior to manufacturing a device (e.g., device 102*a*), the vendor may use a management service to define the component class(es) 208 and device class 206 used by the device. Once the device has been manufactured, the device may be registered using a registration service. The registration service is given the device's identity records 110 and associates the device's identity records 110 with one or more groups 210 based on component classes 208 identified in identity records 110.

In certain embodiments, a managing organization (e.g., organization 204*a*) creates groups 210 for devices 102 of a vendor (e.g., vendor 202*a*) within the managing organization's context. In certain embodiments, the managing organization cannot otherwise modify the entities in IoT object model 200. The vendor may change the association of identity records 110 for a given device to relate to a group (e.g., group 210*a*) in the managing organization instead of a group (e.g., 210*b*) in the organization of vendor 202. By making this change, the policy management for such associated devices 102 is delegated to the managing organization. The delegation keeps policy event data private to the managing organization such that the organization of vendor 202 cannot access any such event data.

Within a device (e.g., device 102*a*), an agent may be responsible for performing periodic lookups against a cloud-based lookup service to retrieve the group identities (which may be used to enforce policies) associated with identity records 110 provisioned in the device. In certain embodiments, this lookup is performed periodically since the aggregation of identity records 110 in groups 210 may change over time. In certain embodiments, a policy cannot be enforced until the group identities have been retrieved. When the device is powered on, the agent passes its associated identity records 110 to the lookup service to obtain the group identities associated with the identity records 110. Once the group identities have been retrieved, the agent uses the group identities for policy purposes. The identity records 110 may be used to disambiguate the device in case of a policy event since multiple entities may be using the same group identity. During the lifetime of the device, the association of the identity records 110 and the group identities may change over time. To account for this change, the agent may periodically refresh the association of identity records 110 to group identities. Although the device class identities, the component class identities, and the device identities are unique for a given vendor, they may not be unique between different vendors. For example, multiple vendors 202 may have a device identity of #100 or a component identity of #44, where the identities represent different devices/components. Similarly, the group identities may be unique for a given organization (e.g., organization 204*a*) but not across multiple organizations (e.g., organizations 204*a*-204*n*).

In an example embodiment, referring to FIG. 2, vendor 202*a* is initially onboarded by a cloud service provider using an onboarding workflow. Organization 204*a* is created for policy purposes. Vendor 202*a* is assigned a vendor identity and an organization identity. The relationship between organization 204*a* and vendor 202*a* is attributed to describe organization 204*a* as vendor 202*a* or a managing organization. Vendor 202*a* uses the management service to define device classes 206 and component classes 208. Vendor 202*a* may optionally create groups 210 to use for aggregating identity records 110 for policy reasons. The device identity is defined by vendor 202*a* during the assembly of device 102*a*.

An agent on device 102*a* manages identity records 110 and captures the group identities from the lookup service given identity records 110. During manufacturing, a configuration file is stored to a local storage of device 102*a*. The configuration file defines the set of identity records 110 for device 102*a*. Each component of device 102*a* includes its own identity record 110. Identity records 110 may be generated by concatenating the following fields: vendor identity, device class identity, component class identity, and device identity. The vendor identity is common for all records of device 102*a* and denotes the device vendor (e.g., Toyota). The device class identity is common for all records in device 102*a* and denotes the type of device 102*a* (e.g., Toyota Prius). The component class identity differs depending on the type of component being represented by each identity record 110 and denotes the type of component (e.g., infotainment). The device identity is common for all identity records of device 102*a* and denotes which specific device the component is found (e.g., a VIN number of the Toyota Prius).

Vendor 202*a* uses the registration service to register the newly created identity records 110 with the cloud service provider. During registration, identity records 110 are saved to the cloud service provider's cloud-based storage (e.g., data registry 112 of FIG. 1) and associated with their default groups 210, which are saved in the same place. Vendor 202*a* configures the policies that will be applied to groups 210. When device 102*a* is powered on, an agent residing on device 102*a* consumes the configuration file and reaches out to the lookup service to retrieve the identities of groups 210 containing the provided identity records 110. The agent periodically refreshes identity record 110 to group identity mapping using the lookup service. The agent uses the group identity to enforce policies and identity records 110 to identify for which component within device 102*a* the policy is being enforced. During the lifetime of device 102*a*, vendor 202*a* may take the following actions: change the policy applied to groups 210 and/or change the association between identity records 110 and groups 210. Changing the association between identity records 110 and groups 210 requires that the agent refresh the mappings of their identity records 110 to group identities. Changing the association between the identity records 110 and groups 210 allows for delegation of policy management to a different organization (e.g., organization 204*b*). The transfer of identity records 110 from one group (e.g., group 210*a*) to another group (e.g., group 210*b*) may be such that the groups (e.g., groups 210*a* and 210*b*) are owned by different organizations (e.g., organizations 204*a* and 204*b*).

When designing a complex device (e.g., one with multiple components which require their own policies), the composition of the device must be represented in IoT object model 200 so that identity and policy can be applied. As an initial step in IoT object model 200, vendor 202*a* is onboarded. To onboard the vendor 202*a*, a security provider creates a vendor object in IoT object model 200, and vendor 202*a* is assigned a unique identity associated with vendor 202*a*. The device designer determines the type of device that is being assembled (e.g., a smart lightbulb) with at least one component (e.g., a component that is network-enabled which reaches out to the cloud for configuration and a component that listens for lighting commands on the local network by a command application). The type of device is represented in object model 200 by device class 206. The type of component being protected is represented in object model 200 by component class 208. Each component is represented by its own component class 208. Using device class 206 and component class 208, vendor 202*a* creates a logical representation of the type of device that is to be secured. A side effect of creating component class 208 in object model 200 is the implicit creation of a default group for identity records 110 which refer to that particular component class 208.

Any device class 206 or component class 208 created by vendor 202*a* is associated with that vendor 202*a* in IoT object model 200. Component class 208 and device class 206 are defined in object model 200 before device 102*a* is registered for use. During manufacturing, device 102*a* is provisioned with the vendor identity, the device class identity, and all the relevant component class identities. Device 102*a* is assigned a distinct device identity (e.g., a serial number) which identifies the specific device (e.g., lightbulb A versus lightbulb B). When provisioning device 102*a* on the assembly line with this information, identity record 110*a* may be kept of the n-tuples<manufacturer identity, device class identity, component class identity, device identity>. For example, wherein a smart lightbulb has two components, there would be two n-tuples, wherein all fields would be the same except for the component class identity field, which would be used to differentiate the components. These n-tuples are referred to as identity records 110.

Either before or after device 102*a* is manufactured, identity records 110 are sent to the IoT cloud-based registration service. During registration identity records 110 are recorded and associated with the default group based on their component classes 208. In the cloud services, the IoT cloud-based lookup service is populated with the associations of identity records 110 to the group identities that were created during registration. In certain embodiments, registration is done in an out-of-band system and is not part of the device's behavior. The registration may be done before or after the manufacturing/assembly of device 102*a*, if identity records 110 are known. The registration may be done in bulk for many devices 102 at the same time. The process of registration does not impact the assembly line. Manufacturing may continue even if there is a system outage affecting the IoT cloud-based registration service. This registration process improves the security of the IoT cloud-based registration service versus having registration done by the IoT device itself because registration may happen only from a secured, trusted communication link instead of from possibly millions of different, potentially hackable, devices. Once registration is completed, device 102*a* may be turned on. After being turned on, device 102*a* may make a network call to the IoT cloud-based lookup service to retrieve the group identities and/or policy details that are associated with the device's various identity records 228. Organization 204*a* may use the IoT cloud-based management service to define new groups 210 (for policy reasons) and to change the association of identity records 110 with those groups 210. As such, an agent installed on device 102*a* may make periodic calls to the IoT cloud-based lookup service to retrieve the most recent group identities (or policy details) for its identity records 110.

The combination of identity records 110 and groups 210 allows for the application of distinct policies to different device components, depending on the components' requirements. When looking at the IoT ecosystem at scale, there may be many millions of devices 102, all performing the same function. Managing policy for individual devices 102 or individual device components within a device can be a time-consuming task if each device component were assigned its own policy-enabled identity. To manage the device components at scale, the device components are aggregated into groups 210, and policy is then applied to the group. In practical terms, this aggregation greatly reduces the complexity of the policies that need to be created because of the vast reduction in the number of identities to which the policies apply. Identification of the specific, physical devices and components is not lost. In the event of a policy violation, the group identity and an identity record (e.g., identity record 110*a*) may be used in conjunction where the group identity is used to apply policy, and the identity record is used to uniquely identify the component within the specific device which triggered the policy event.

An organization does not have to be a vendor to make use of the system. An organization may, with the correct checks and balances enforced by some other mechanism, make use of a vendor's IoT object model 200 in the following way. An organization (e.g., organization 204*a*) may be designated as a managing organization for devices 102 of a given vendor (e.g., vendor 202*a*). In this event, the vendor identity of vendor 202*a* is associated with the managing organization, which gives the managing organization the ability to read but not modify the vendor's device class, device, and component class identities. The managing organization may create groups 210 based on component classes 208 of the vendor organization, but within the context of the managing organization.

The association of identity records 110 to groups 210 may be changed over time using the IoT cloud-based management service. By allowing a managing organization to create and maintain groups 210 for a vendor's component classes 208, identity records 110 may have their management delegated to the managing organization by associating identity records 110 to groups 210 owned by the managing organization rather than to groups 210 owned by the manufacturer organization. By associating the identity records 110 to groups 210 owned by the managing organization, any events generated by devices 102 represented by identity records 110 are isolated to the managing organization's event record and are not available to the manufacturer organization.

Delegation of management of devices 102 to organizations 204 other than the vendor is beneficial because the vendor may not want to manage devices 102 (for legal or practical reasons). For devices 102 that are automobiles, this behavior may allow management of fleets by entities other than the automobile manufacturer. The data is private to the managing organization. Identity records 110 may require changes over time, for example, if the device needs maintenance or remediation. In such a case, where the component class (e.g., component class 208*a*) of a replaced component changes or the device identifier changes for some reason, identity records 110 containing the pertinent fields can be updated.

Although FIG. 2 describes and illustrates a particular diagram of an IoT object model 200, this disclosure contemplates any suitable a diagram of an IoT object model. Although FIG. 2 describes and illustrates particular components, devices, or systems carrying out particular actions, this disclosure contemplates any suitable combination of any suitable components, devices, or systems carrying out any suitable actions of FIG. 2.

Figure 3:
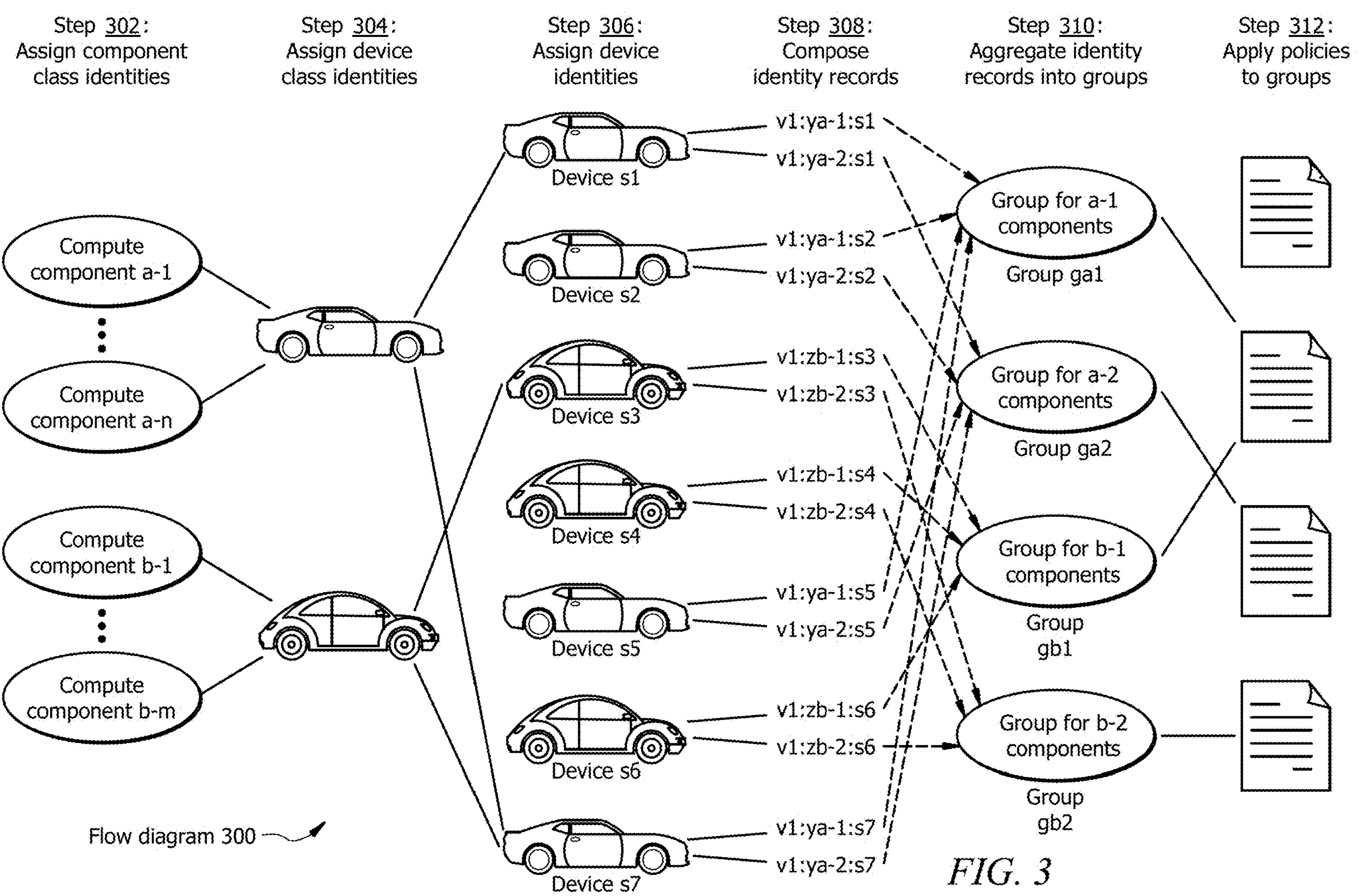
FIG. 3 illustrates a flow diagram for device identity management, according to an embodiment.

FIG. 3 illustrates a flow diagram 300 for device identity management, according to an embodiment. Flow diagram 300 of FIG. 3 provides a visualization of the identity flow described in FIG. 2 through to the policy. Flow diagram 300 displays the composition of a physical device (device 102*a*), how the identities are assigned, how the composition of an identity record is done, the aggregation of identity records into groups, and the association of the groups with policies. Flow diagram 300 is in the context of a single vendor.

At step 302 of flow diagram 300, a vendor (e.g., vendor 202*a* of FIG. 2) assigns, using an object model (e.g., IoT object model 200 of FIG. 2), component class identities to each of the vendor's component classes (e.g., component classes 208 of FIG. 2). Each device class (Model y and Model z) has the same type(s) of compute units. Each compute unit is represented by a component class and assigned a component class identity. In the illustrated embodiment of FIG. 3, component class identities are represented as compute components a-1 through a-n and compute components b-1 through b-m.

At step 304 of flow diagram 300, the vendor assigns, using the object model, device class identities to each of the vendor's device classes (e.g., device classes 206 of FIG. 2). In the illustrated embodiment of FIG. 3, the device class identities represent different models of IoT devices from a given vendor, each of which has a unique device class. These IoT device models include well-defined compute units. In the illustrated embodiment of FIG. 3, model y and model z are each assigned a device class identity, where y represents the device class identity for model y and z represents the device class identity for model z.

At step 306 of flow diagram 300, the vendor assigns, using the object model, device identifiers to each of the vendor's devices. Each device is associated with a unique device identity. In the illustrated embodiment of FIG. 3, the devices (automobiles) are each assigned a unique device identity (s1 though s7).

At step 308 of flow diagram 300, a service provider composes identity records (e.g., identity records 110 of FIGS. 1 and 2) for each device. In the illustrated embodiment of FIG. 3, each device has two components, and one identity record is composed for each component per device class (e.g., model). The two identity records for device s1 are represented as: (1) v1:ya-1:s1, where v1 represents the vendor identity, y represents the device class identity, a-1 represents the component class identity, and s1 represents the device identity; and (2) v1:ya-2:s1, where v1 represents the vendor identity, y represents the device class identity, a-2 represents the component class identity, and s1 represents the device identity. The two identity records for device s1 are identical with the exception of the component class identity (a-1 versus a-2).

The two identity records for device s2 are represented as: (1) v1:ya-1:s2, where v1 represents the vendor identity, y represents the device class identity, a-1 represents the component class identity, and s2 represents the device identity; and (2) v1:ya-2:s2, where v1 represents the vendor identity, y represents the device class identity, a-2 represents the component class identity, and s2 represents the device identity. Again, the two identity records for device s1 are identical with the exception of the component class identity (a-1 versus a-2). Similarly, each pair of identity records for devices s3 though s7, respectively, are identical with the exception of the component class identity.

At step 310 of flow diagram 300, the service provider aggregates the identity records into groups (e.g., groups 210 of FIG. 2). The groups aggregate the identity records of the same component class, and the mapping of the identity record to the group is stored in the cloud. The mapping can change over time. The group identity is the policy-enabled identity. In the illustrated embodiment of FIG. 3, group ga1 represents a group of identity records for the a-1 components, group ga2 represents a group of identity records for the a-2 components, group gb1 represents a group of identity records for the b-1 components, and group gb2 represents a group of identity records for the b-2 components.

The association of identity records to groups may be changed over time using an IoT cloud-based management service. By allowing a managing organization to create and maintain groups for a vendor's component classes, the identity records may have their management delegated to the managing organization by associating the identity records to groups owned by the managing organization rather than to groups owned by the vendor organization.

At step 312 of flow diagram 300, the service provider applies policies to the group. A policy may apply to no groups, one group, or multiple groups. As such, by associating several identity records with a given group identity, scalability beyond what would be possible if the identity records were policy-enabled identities because the volume of identities is greatly reduced.

Although FIG. 3 describes and illustrates a particular flow diagram for device identity management, this disclosure contemplates any suitable a flow diagram for device identity management. Although FIG. 3 describes and illustrates particular components, devices, or systems carrying out particular steps in a particular order, this disclosure contemplates any suitable combination of any suitable components, devices, or systems carrying out any suitable steps in FIG. 2 in any suitable order.

Figure 4:
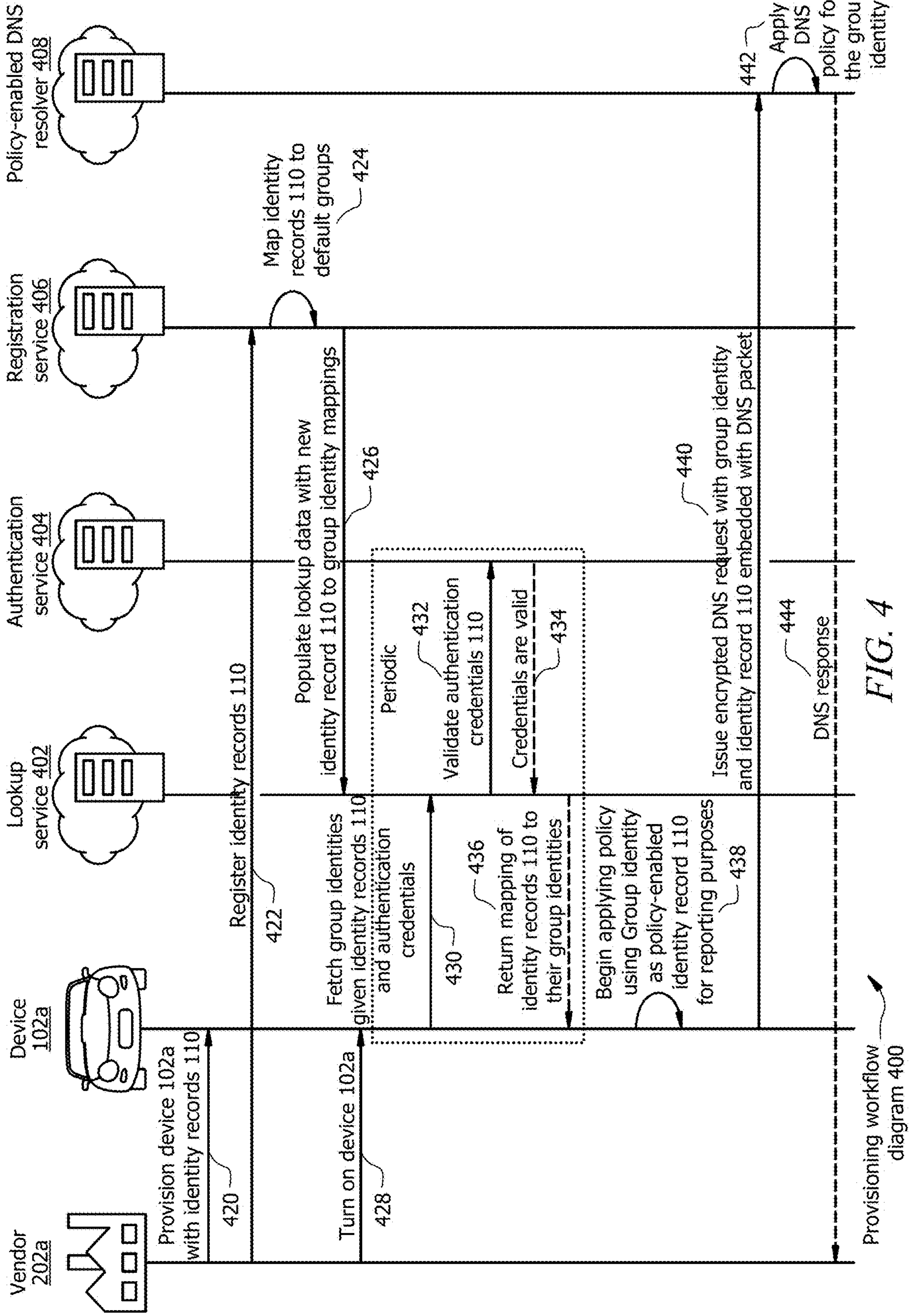
FIG. 4 illustrates a provisioning workflow diagram for device identity management, according to an embodiment.

FIG. 4 illustrates a provisioning workflow diagram 400 for device identity management, according to an embodiment. Provisioning workflow diagram 400 allows for the provisioning and management of identities of different components of a device. For example, embodiments relate to the provisioning and management of IoT identities with granular identities and their policies, which may be scalable and performant based on the component class and component group corresponding to different device components.

Devices may be uniquely identified and managed at a mass scale. Each device may require security protection. Further, each device component may also require security protections from time to time periodically and dynamically. To provide security protections, the devices and their respective device components may be uniquely identified to affect security controls and allow observability platforms. In existing systems, identities of the device may involve a one-to-one (1:1) mapping. Such an identity may be coarse and may not provide further information or data about the device components that originated requested traffic or services (e.g., DNS requests) to aid observability platforms. For example, there may be a device mapping but not the device components mapping that requires specific periodic granular policies.

DNS requests may be received from a device component, which may be among a plurality of device components. Certain embodiments detect the DNS requests of the device component and determine a c group of the device component using a source internet protocol (IP) address of the DNS requests. The group identity from the component group can then be determined and used to perform a lookup API in the data registry to request a policy identity based on component group identity and the component class identity. In particular, the lookup API may look into the data registry having different tables mapped to a combination of vendors, device classes, component classes, and groups. From the lookup API, security policy enforcement may be identified and updated to graphical user interface (GUI) of the device for updating the policy identity to the component group.

In provisioning workflow diagram 400, an agent for a vendor (e.g., vendor 202*a* of FIG. 2) has pre-created component classes (e.g., component classes 208 of FIG. 2) and device classes (e.g., device classes 206 of FIG. 2) for each type of device (e.g., devices 102 of FIGS. 1 and 2) being manufactured. Provisioning workflow diagram 400 of FIG. 4 includes vendor 202*a*, device 102*a*, lookup service 402, authentication service 404, registration service 406, and a policy-enabled DNS resolver 408.

Lookup service 402 represents a cloud-available service that allows a lookup of group identities given a set of identity records 110. Authentication service 404 represents a cloud-available service that is used to authenticate identities. Registration service 406 represents a cloud-available service that associates newly created identity records 110 with their default group identities. Policy-enabled DNS resolver 408 represents a specific type of DNS server responsible for translating domain names into internet protocol (IP) addresses.

At step 420 of provisioning workflow diagram 400, vendor 202*a* provisions device 102*a* with identity records 110 during manufacturing. Each identity record 110 includes a device identity, a vendor identity, a device class identity, and a component class identity. At step 422 of provisioning workflow diagram 400, vendor 202*a* registers identity records 110 with registration service 406. In certain embodiments, registration service 406 records identity records 110 in a data registry (e.g., data registry 112 of FIG. 1). At step 424 of provisioning workflow diagram 400, registration service 406 maps identity records 110 to default groups. In certain embodiments, registration service 406 may associate identity records 110 based on their component class identities. At step 426 of provisioning workflow diagram 400, lookup service 402 populates lookup data with new identity record 110 to group identity mappings. In certain embodiments, lookup service 402 performs lookup API in the data registry based on the group identity to update a security policy enforcement for the group. At step 428 of provisioning workflow diagram 400, vendor 202*a* turns on device 102*a*. After being turned on, device 102*a* may make a network call to the lookup service 402 to retrieve the group identities (or possibly policy details) that are associated with the various identity records 110 of device 102*a*.

Steps 430 through 436 may be performed periodically to determine changes in the identity records 110 to group identity mappings. At step 430 of provisioning workflow diagram 400, device 102 fetches group identities given identity records 110 and authentication credentials. At step 432 of provisioning workflow diagram 400, lookup service 402 sends a request to authentication service 404 to validate the authentication credentials. For example, lookup service 402 may send a request for an authentication token (e.g., an OAuth access token) for an invocation of API. For control pane web service, lookup service 402 may request a fresh authentication token for every invocation of the API. In certain embodiments, the authentication token includes the device identity (e.g., a globally unique identifier (GUID)) as its identity to authenticate. In an embodiment, the cloud-to-cloud communication may be an inter-organizational channel that may be established to service DNS requests. At step 434 of provisioning workflow diagram 400, authentication service 404 validates the authentication credentials and sends a notification to lookup service 402. At step 436 of provisioning workflow diagram 400, lookup service 402 returns the mapping of identity records 110 to their group identities to device 102*a*.

At step 438 of provisioning workflow diagram 400, device 102*a* begins applying one or more policies using group identities as policy-enabled identity and identity records 110 for reporting purposes. A policy is a set of rules that describes restrictions or allowances based on some form of identity. At step 440 of provisioning workflow diagram 400, device 102*a* issues an encrypted DNS request with group identity and identity records 110 embedded within the DNS packet data to policy-enabled DNS resolver 408. In certain embodiments, the DNS packet is encrypted using DNSCrypt (which uses the symmetric key derived from the local private key and the resolver's public key obtained from the DNSCrypt certificate). At step 442 of provisioning workflow diagram 400, policy-enabled DNS resolver 408 applies DNS policy for the group identity. At step 444 of provisioning workflow diagram 400, policy-enabled DNS resolver 408 sends a DNS response to device 102*a*.

Although FIG. 4 describes and illustrates a particular provisioning workflow diagram for device identity management, this disclosure contemplates any suitable provisional workflow diagram for device identity management. Although FIG. 4 describes and illustrates particular components, devices, or systems carrying out particular steps in a particular order, this disclosure contemplates any suitable combination of any suitable components, devices, or systems carrying out any suitable steps in FIG. 4 in any suitable order.

Figure 5:
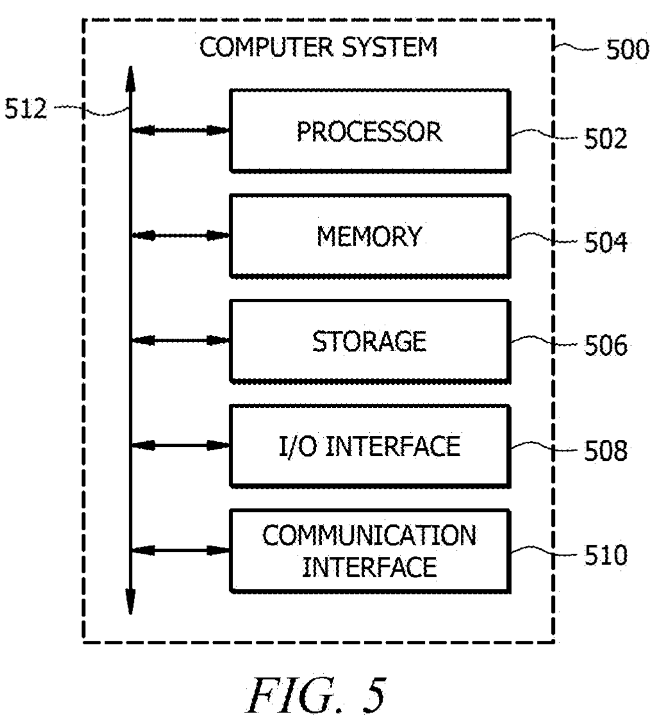
FIG. 5 illustrates computer system, according to an embodiment.

FIG. 5 illustrates an example computer system 500. In particular embodiments, one or more computer systems 500 perform one or more steps of one or more methods described or illustrated herein. In particular embodiments, one or more computer systems 500 provide the functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memory 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may allow communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers allowing processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. The embodiments disclosed herein are only examples, and the scope of this disclosure is not limited to them. Particular embodiments may include all, some, or none of the components, elements, features, functions, operations, or steps of the embodiments disclosed herein. Embodiments according to the present disclosure are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, allowed to, operable to, or operative to perform a particular function encompasses that apparatus, system, component, whether or not it or that particular function is activated, turned on, or unlocked, as long as that apparatus, system, or component is so adapted, arranged, capable, configured, allowed, operable, or operative. Additionally, although this disclosure describes or illustrates particular embodiments as providing particular advantages, particular embodiments may provide none, some, or all of these advantages.

What is claimed is:

1. A server, comprising:

one or more processors; and one or more computer-readable non-transitory storage media coupled to the one or more processors and comprising instructions that, when executed by the one or more processors, cause the server to perform operations comprising:

onboarding a vendor to an object model, wherein the vendor is associated with a vendor identity;

generating a component class in the object model, wherein the component class is associated with a component class identity;

generating a device class in the object model, wherein the device class is associated with a device class identity;

generating a device in the object model, wherein the device is associated with a device identity;

generating an identity record for a component of the device, wherein the identity record comprises the vendor identity, the component class identity, the device class identity, and the device identity;

assigning the identity record to a group, wherein the group comprises a plurality of identity records, the plurality of identity records is associated with a plurality of devices and a plurality of vendors, and each of the plurality of identity records shares the same component class identity; and assigning a policy to the group.

2. The server of claim 1, wherein:

the vendor identity and the identity record are each a globally unique identifier; and the component class identity, the device class identity, and the device identity are each a unique identifier with respect to the vendor but not a globally unique identifier.

3. The server of claim 1, wherein:

the vendor is associated with a managing organization;

the vendor is granted read-write permissions to the component class, the device class, and the device but a read-only permission to the group; and the managing organization is granted read-write permissions to the group but a read-only permission to the component class, the device class, and the device.

4. The server of claim 1, the operations further comprising:

provisioning the device with the identity record; and communicating the identity record to a cloud-based registration service, wherein the cloud-based registration service performs registration via an out-of-band system.

5. The server of claim 1, the operations further comprising:

mapping the identity record to a group identity;

receiving, from the device, the identity record;

validating authentication credentials associated with the device;

communicating the mapping of the identity record to the group identity to the device in response to validating the authentication credentials; and applying the policy to the component of the device, wherein:

the policy is enforced based on the group identity; and the identity record is used to identify the component of the device.

6. The server of claim 1, wherein:

the device represents an automobile;

the vendor represents a maker of the automobile;

the device class represents a model produced by the maker of the automobile;

the component class represents a component of the model produced by the maker of the automobile; and the device identity represents a serial number assigned to the automobile.

7. The server of claim 1, the operations further comprising:

initiating, by the vendor, a first change to the policy assigned to the group; and initiating, by the vendor, a second change to the plurality of identity records that are assigned to the group.

8. A method, comprising:

onboarding a vendor to an object model, wherein the vendor is associated with a vendor identity;

generating a component class in the object model, wherein the component class is associated with a component class identity;

generating a device class in the object model, wherein the device class is associated with a device class identity;

generating a device in the object model, wherein the device is associated with a device identity;

generating an identity record for a component of the device, wherein the identity record comprises the vendor identity, the component class identity, the device class identity, and the device identity;

assigning the identity record to a group, wherein the group comprises a plurality of identity records, the plurality of identity records is associated with a plurality of devices and a plurality of vendors, and each of the plurality of identity records shares the same component class identity; and assigning a policy to the group.

9. The method of claim 8, wherein:

the vendor identity and the identity record are each a globally unique identifier; and the component class identity, the device class identity, and the device identity are each a unique identifier with respect to the vendor but not a globally unique identifier.

10. The method of claim 8, wherein:

the vendor is associated with a managing organization;

the vendor is granted read-write permissions to the component class, the device class, and the device but a read-only permission to the group; and the managing organization is granted read-write permissions to the group but a read-only permission to the component class, the device class, and the device.

11. The method of claim 8, further comprising:

provisioning the device with the identity record; and communicating the identity record to a cloud-based registration service, wherein the cloud-based registration service performs registration via an out-of-band system.

12. The method of claim 8, further comprising:

mapping the identity record to a group identity;

receiving, from the device, the identity record;

validating authentication credentials associated with the device;

communicating the mapping of the identity record to the group identity to the device in response to validating the authentication credentials; and applying the policy to the component of the device, wherein:

the policy is enforced based on the group identity; and the identity record is used to identify the component of the device.

13. The method of claim 8, wherein:

the device represents an automobile;

the vendor represents a maker of the automobile;

the device class represents a model produced by the maker of the automobile;

the component class represents a component of the model produced by the maker of the automobile; and the device identity represents a serial number assigned to the automobile.

14. The method of claim 8, further comprising:

initiating, by the vendor, a first change to the policy assigned to the group; and initiating, by the vendor, a second change to the plurality of identity records that are assigned to the group.

15. One or more computer-readable non-transitory storage media embodying instructions that, when executed by a processor, cause the processor to perform operations comprising:

onboarding a vendor to an object model, wherein the vendor is associated with a vendor identity;

generating a component class in the object model, wherein the component class is associated with a component class identity;

generating a device class in the object model, wherein the device class is associated with a device class identity;

generating a device in the object model, wherein the device is associated with a device identity;

generating an identity record for a component of the device, wherein the identity record comprises the vendor identity, the component class identity, the device class identity, and the device identity;

assigning the identity record to a group, wherein the group comprises a plurality of identity records, the plurality of identity records is associated with a plurality of devices and a plurality of vendors, and each of the plurality of identity records shares the same component class identity; and assigning a policy to the group.

16. The one or more computer-readable non-transitory storage media of claim 15, wherein:

the vendor identity and the identity record are each a globally unique identifier; and the component class identity, the device class identity, and the device identity are each a unique identifier with respect to the vendor but not a globally unique identifier.

17. The one or more computer-readable non-transitory storage media of claim 15, wherein:

the vendor is associated with a managing organization;

the vendor is granted read-write permissions to the component class, the device class, and the device but a read-only permission to the group; and the managing organization is granted read-write permissions to the group but a read-only permission to the component class, the device class, and the device.

18. The one or more computer-readable non-transitory storage media of claim 15, the operations further comprising:

provisioning the device with the identity record; and communicating the identity record to a cloud-based registration service, wherein the cloud-based registration service performs registration via an out-of-band system.

19. The one or more computer-readable non-transitory storage media of claim 15, the operations further comprising:

mapping the identity record to a group identity;

receiving, from the device, the identity record;

validating authentication credentials associated with the device;

communicating the mapping of the identity record to the group identity to the device in response to validating the authentication credentials; and applying the policy to the component of the device, wherein:

the policy is enforced based on the group identity; and the identity record is used to identify the component of the device.

20. The one or more computer-readable non-transitory storage media of claim 15, the operations further comprising:

initiating, by the vendor, a first change to the policy assigned to the group; and initiating, by the vendor, a second change to the plurality of identity records that are assigned to the group.

* * * * *